United States Patent
Eblenkamp et al.

(10) Patent No.: US 7,314,250 B1
(45) Date of Patent: Jan. 1, 2008

(54) FITTING SYSTEM FOR A VEHICLE SEAT

(75) Inventors: Michael Eblenkamp, Clarkston, MI (US); Dirk Brassat, Clarkston, MI (US); Martin Stilleke, Clarkston, MI (US); Donald Eugene Smith, Lake Ozark, MO (US)

(73) Assignee: KEIPER GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 11/528,270

(22) Filed: Sep. 27, 2006

(51) Int. Cl.
*B60N 2/22* (2006.01)
(52) U.S. Cl. ..................................... 297/362; 297/367
(58) Field of Classification Search ................ 297/362, 297/367; 475/162
See application file for complete search history.

(56) References Cited

U.S. PATENT DOCUMENTS

| | | | |
|---|---|---|---|
| 3,171,699 A | 3/1965 | Maxey | |
| 4,371,207 A | 2/1983 | Wilking et al. | |
| 4,439,053 A | 3/1984 | Pelz | |
| 4,582,360 A | 4/1986 | Becker | |
| 5,154,475 A | 10/1992 | Kafitz | |
| 5,277,672 A | 1/1994 | Droulon et al. | |
| 5,524,970 A | 6/1996 | Kienke et al. | |
| 5,586,833 A * | 12/1996 | Vossmann et al. | 403/359.6 |
| 5,634,380 A | 6/1997 | Scholz et al. | |
| 5,634,689 A | 6/1997 | Putsch et al. | |
| 5,810,442 A | 9/1998 | Ito et al. | |
| 5,816,656 A * | 10/1998 | Hoshihara et al. | 297/367 |
| 5,871,414 A | 2/1999 | Voss et al. | |
| 6,095,608 A * | 8/2000 | Ganot et al. | 297/367 |
| 6,305,748 B1 | 10/2001 | Ohba | |
| 6,318,806 B1 | 11/2001 | Levert et al. | |
| 6,543,849 B1 * | 4/2003 | Yamada | 297/363 |
| 6,619,743 B1 | 9/2003 | Scholz et al. | |
| 6,637,821 B2 | 10/2003 | Lee et al. | |
| 7,188,903 B2 * | 3/2007 | Finner et al. | 297/362 |
| 7,201,447 B2 * | 4/2007 | Yamada | 297/367 |
| 2004/0036338 A1 * | 2/2004 | Lardais et al. | 297/367 |
| 2005/0179297 A1 | 8/2005 | Finner et al. | |

FOREIGN PATENT DOCUMENTS

CA 2019952 12/1990

(Continued)

*Primary Examiner*—Peter R. Brown
(74) *Attorney, Agent, or Firm*—Womble Carlyle Sandridge & Rice, PLLC

(57) ABSTRACT

A first fitting and a second fitting are driven by a common drive shaft. Each of the fittings has a first fitting part and a second fitting part that are connected to one another by a gear mechanism so that there can be a rolling movement of the second fitting part on the first fitting part, with an angle defined between the fitting parts being changed by the rolling movement. Each of the fittings has a driver rotatably mounted in its first fitting part and driving an eccentric arranged so that rotation of the driver causes the rolling movement of the second fitting part on the first fitting part, when the driver is driven by the drive shaft. A stopper is mounted on the first fitting for limiting the angle between the fitting parts. The driver of the first fitting is made of a material with a high mechanical strength and the driver of the second fitting is made of a material with a lower mechanical strength.

12 Claims, 5 Drawing Sheets

FOREIGN PATENT DOCUMENTS

| | | |
|---|---|---|
| DE | 39 41 215 A1 | 6/1991 |
| DE | 40 07 023 A1 | 9/1991 |
| DE | 94 05 443 U1 | 6/1994 |
| DE | 195 33 453 A1 | 3/1997 |
| DE | 197 16 813 A1 | 10/1998 |
| DE | 195 48 809 C1 | 2/1999 |
| DE | 199 56 984 A1 | 6/2000 |
| DE | 199 38 666 A1 | 2/2001 |
| DE | 199 61 639 A1 | 10/2001 |
| FR | 2 656 392 | 6/1991 |
| FR | 2 806 980 | 10/2001 |
| GB | 2 107 386 A | 4/1983 |

* cited by examiner

FITTING SYSTEM FOR A VEHICLE SEAT

BACKGROUND OF THE INVENTION

The present invention relates to a fitting system for a vehicle seat, in particular for a motor vehicle seat, with the fitting system including a first fitting and a second fitting that are driven by a common drive shaft; each of the fittings having a first fitting part and a second fitting part that are connected to one another by a gear mechanism so that there can be a rolling movement of the second fitting part on the first fitting part, with an angle defined between the fitting parts and being changed by the rolling movement; and each of the fittings having a driver rotatably mounted in the first fitting part and driving an eccentric arranged so that rotation of the driver causes the rolling movement of the second fitting part on the first fitting part, when the driver is driven by the drive shaft.

US 2005/0179297 A1 discloses a fitting system of the type described above, with two identical fittings, in which the driver necessary for the driving is of two-part design in the form of a driving bushing made of plastic and a driving ring made of metal. The driving bushing and driving ring are connected to each other in a rotationally fixed manner. For special cases, some features of the fitting system are unused and might be saved.

BRIEF SUMMARY OF SOME ASPECTS OF THE INVENTION

One aspect of the present invention is based on the object of improving a fitting system of the type mentioned above, in particular reducing the production costs. In accordance with this aspect, a fitting system for a vehicle seat, in particular for a motor vehicle seat, includes fittings, a drive shaft for driving both of the fittings, and a stopper. For each fitting, the fitting includes a first fitting part and a second fitting part that are connected to one another by a gear mechanism so that there can be a rolling movement of the second fitting part on the first fitting part, an angle is defined between the first fitting part and the second fitting part, the angle is changed by the rolling movement, and the fitting further includes a driver and an eccentric, wherein the driver is rotatably mounted in the first fitting part for driving the eccentric, and the eccentric is arranged so that rotation of the driver causes the rolling movement of the second fitting part on the first fitting part when the driver is driven. The drive shaft is more specifically for simultaneously driving both the driver of a first of the fittings and the driver of a second of the fittings. The stopper is mounted on the first fitting for limiting at least the angle defined between the first fitting part of the first fitting and the second fitting part of the first fitting. The driver of the first fitting is made of a material with a high mechanical strength and the driver of the second fitting is made of a material with a lower mechanical strength.

Because only the first fitting is provided with a stopper, the load, which occurs when the angle between the fitting parts of the first fitting reaches the stopper-defined limit, only occurs at the first fitting, and not at the second fitting that is without a stopper. Thus, only the driver of the first fitting needs to be capable of withstanding the stopping load. Therefore, the driver of the first fitting is made of a material with a high mechanical strength, e.g. metal, and the driver of the second fitting without a stopper can be made of a cheaper material with a lower mechanical strength, e.g. plastic, thereby reducing the production costs for the fitting system.

Compared to a simple pivot joint instead of the second fitting, using the second fitting has the advantage that in case of an impact load (e.g. crash), the load from the backrest does not easily pass the second fitting but is received by the gear mechanism between the two fitting parts. The load path is the same for both fittings. The load is carried between the two fitting parts and wedge segments without passing the drivers.

If a motor is provided for driving the drive shaft, the motor can be advantageously mounted closer to the first fitting with the stopper than to the second fitting without a stopper or mounted on the side of the first fitting faced away from the second fitting. This has the advantage that the first fitting with its driver and its stopper absorbs the motor stall force. It also minimizes the torsion of the drive shaft, so both fittings are stopped simultaneously.

The fitting system according to the invention is preferably designed for a motor drive, but it may also be driven manually. The invention can also be used in other gear-type fittings which are driven by motor or manually, irrespective of whether an eccentric made from wedges or a substantially rigid eccentric is provided.

Other aspects and advantages of the present invention will become apparent from the following.

BRIEF DESCRIPTION OF THE DRAWINGS

The invention is explained in greater detail below with reference to an exemplary embodiment, which is illustrated in the drawings, in which.

DETAILED DESCRIPTION OF EXEMPLARY EMBODIMENT

Figure 1:
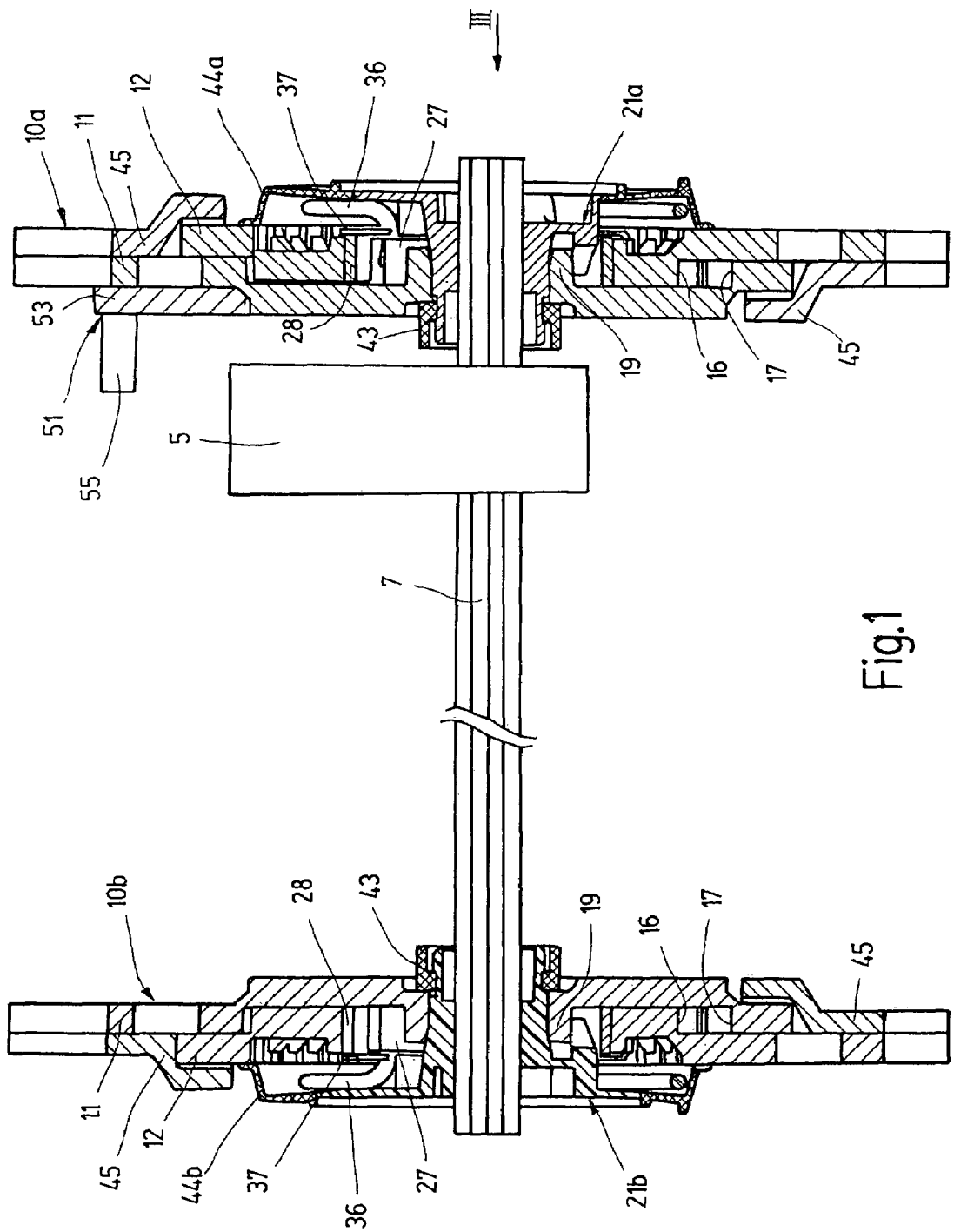
FIG. 1 shows a sectional view of the fitting system with a first fitting on the right side and a second fitting on the left side.
Figure 2:
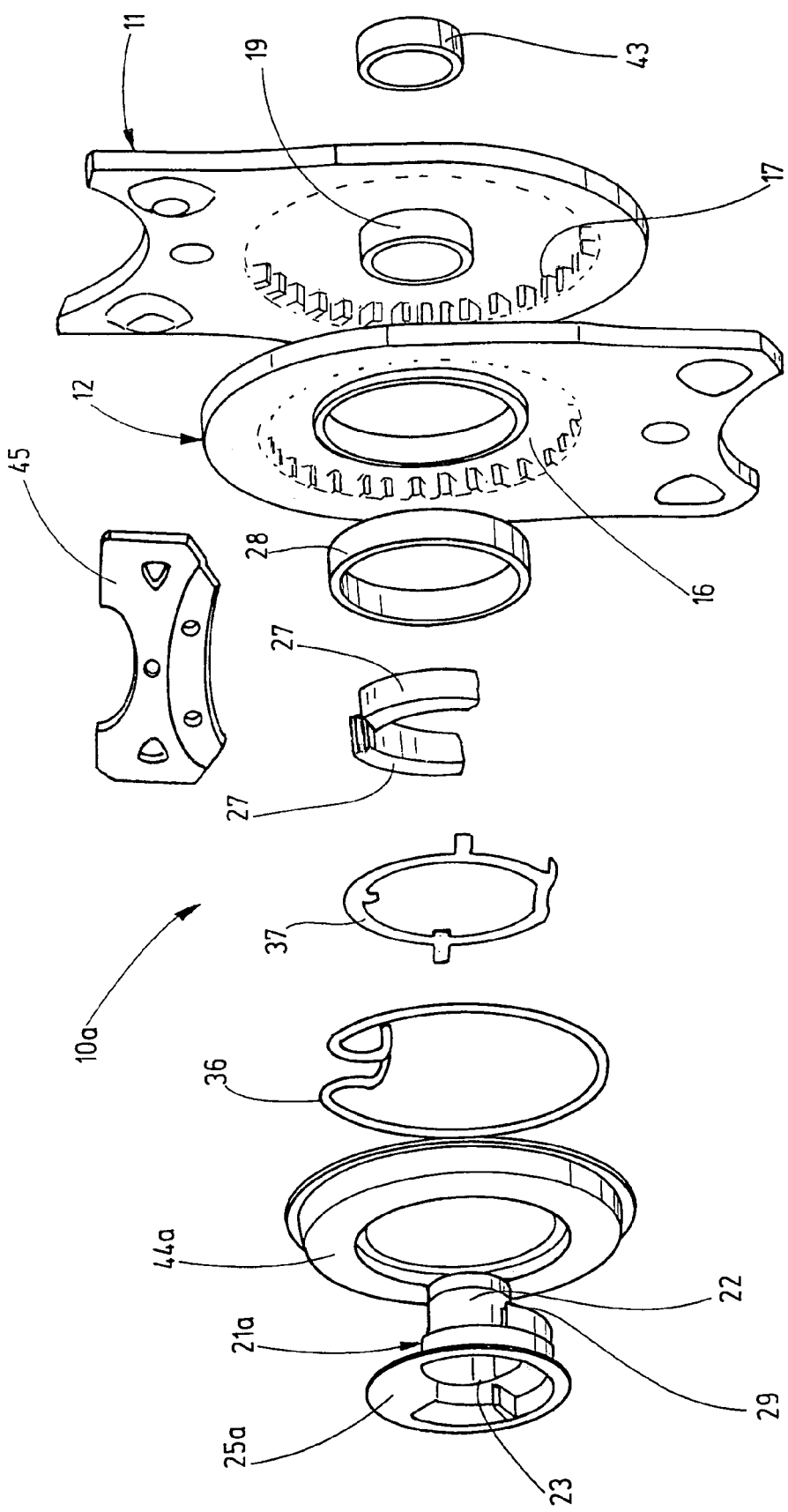
FIG. 2 shows an exploded illustration of the first fitting.
Figure 3:
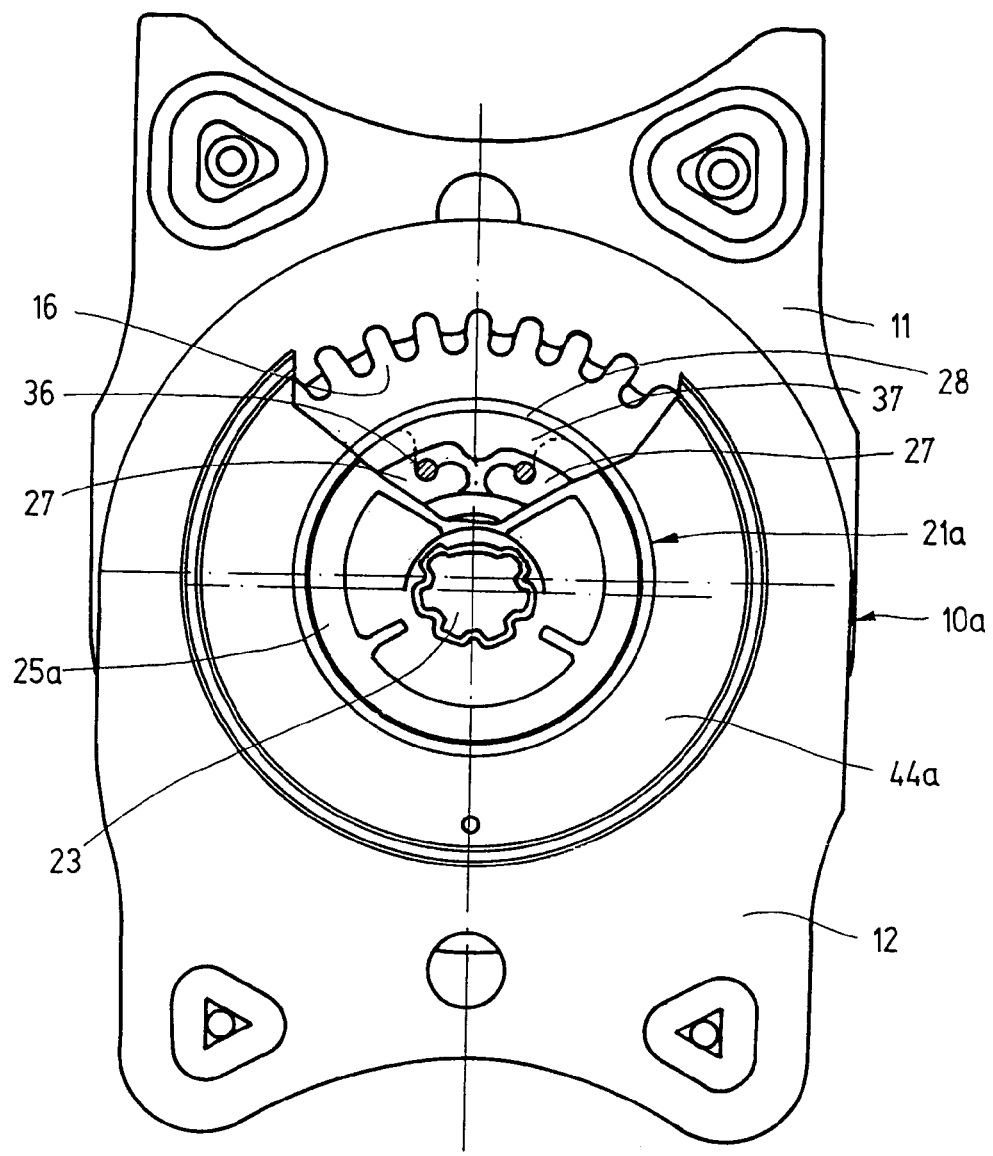
FIG. 3 shows a partially sectional view of the first fitting in the direction of the arrow III in FIG. 1.
Figure 4:
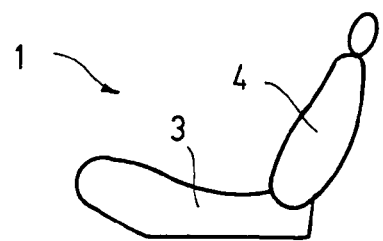
FIG. 4 shows a schematic illustration of a vehicle seat having a fitting system according to the invention.
Figure 5:
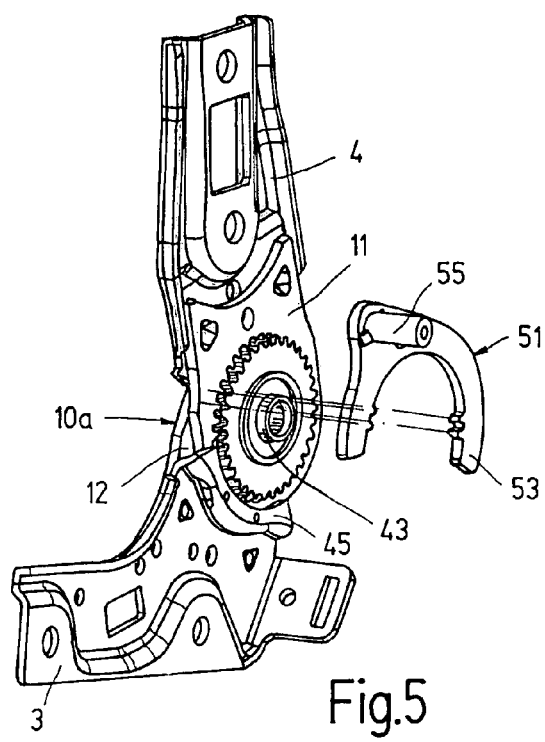
FIG. 5 shows a perspective view of the first fitting when the stopper is mounted.
Figure 6:
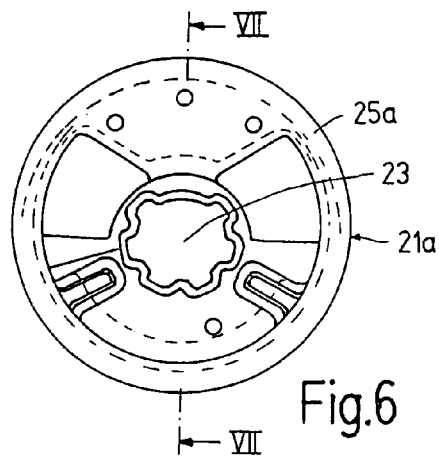
FIG. 6 shows a view of the driver of the first fitting in the direction of the arrow VI in FIG. 7.
Figure 7:
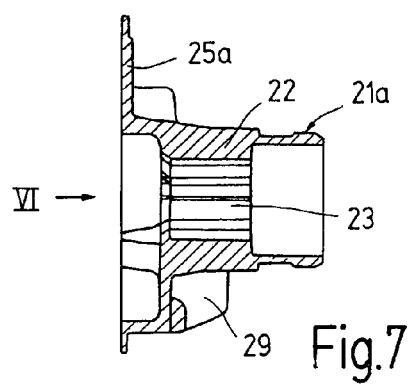
FIG. 7 shows an axial section through the driver of the first fitting along the line VII-VII in FIG. 6.

A vehicle seat 1 for a motor vehicle has a seat part 3 and a backrest 4 that can be adjusted in its inclination relative to the seat part 3 by an electric motor 5. The motor 5 (which is schematically illustrated in FIG. 1) is fitted on the structure of the backrest 4 and functions as a drive for the inclination adjustment. The electric motor 5 rotates a drive shaft 7 which is arranged horizontally in the transition region between the seat part 3 and backrest 4. The electric motor 5 is arranged on one side of the vehicle seat 1, called the driving side. The opposite side of the vehicle seat 1 is called the driven side. On both sides of the vehicle seat 1, the drive shaft 7 engages (in a way which is described below) in a rotationally fixed manner in a fitting, i.e. on the driving side, the drive shaft 7 engages a first fitting 10a (recliner), and on the driven side, the drive shaft 7 engages a second fitting 10b (recliner). The drive shaft 7 defines the cylindrical coordinates used below.

Each of the two fittings 10a, 10b is designed as a geared fitting, in which a first fitting part 11 and a second fitting part 12 are connected to each other for adjustment and fixing purposes via a gear mechanism. The two fitting parts 11 and 12 have an essentially flat shape and consist of steel. The first fitting part 11 is connected fixedly to the structure bearing the driving electric motor 5 (in the present case the structure of the backrest 4), for which reason, in the exemplary embodiment, the first component 11 is fixed on the backrest and is therefore illustrated at the top in the drawings. Correspondingly, in the exemplary embodiment, the second fitting part 12 is fixed on the seat part and is illustrated at the bottom in the drawings. In the case of a different arrangement of the electric motor 5 and with manually driven fittings, the positions of the fitting parts 11 and 12 can be interchanged.

In order to form the gear mechanism, a gearwheel 16 having external teeth is embossed on the second fitting part 12, and a gearing 17 having internal teeth is embossed on the first fitting part 11, with the gearwheel and gearing intermeshing. The diameter of the outside circle of the external teeth of the gearwheel 16 is smaller by at least one tooth height than the diameter of the root circle of the internal teeth of the gearing 17. The corresponding difference between the number of teeth of the gearwheel 16 and gearing 17 enables the gearing 17 to roll on the gearwheel 16.

The first fitting part 11 has, concentrically with the internal teeth of the gearing 17, an integrally formed collar 19 on the side facing the gearwheel 16. The first fitting 10a comprises a driver 21a, while the second fitting comprises a driver 21b. Each driver 21a, 21b is rotatably mounted in the collar 19 of the corresponding fitting 10a or 10b by means of a hub 22. The hub is provided in the center with a hole 23. The profile of the hole 23 is matched with the profile of the drive shaft 7, namely the external splines of the drive shaft 7.

The driver 21a of the first fitting 10a is made of a material with a high mechanical strength, e.g. metal, more specifically by metal injection molding (MIM) process carried out with steel, zinc, or aluminum powder and that includes a sintering step after the molding step. The driver 21a can also be made of a fiber-glass reinforced plastic with more than 50% fibers. At the end of the driver 21a facing away from the first fitting part 11, the driver 21a is provided with an integrally formed covering disk 25a that has a diameter that is larger than the diameter of the hub 22.

The driver 21b of the second fitting 10b is made of a material with a lower mechanical strength, e.g. plastic (e.g., polymeric material), more specifically by injection molding the plastic. The driver 21b can also be made of a fiber-glass reinforced plastic or zinc injection molding. At the end of the driver 21b facing away from the first fitting part 11, the driver 21b is provided with an integrally formed covering disk 25b that has a diameter that is larger than the diameter of the hub 22. The diameter of the covering disk 25b is larger than the diameter of the covering disk 25a.

Each fitting 10a, 10b is provided with two wedge segments 27. The wedge segments 27 are supported, by way of their curved inner surfaces, on the collar 19, with the wedge segments 27 supporting, by way of their curved outer surfaces, a sliding bearing bushing 28. The bearing bushing 28 is pressed in a rotationally fixed manner into the second fitting part 12. Each driver 21a, 21b is provided with a driving segment 29 which is held with play between the narrow sides of the respective wedge segments 27.

For each pair of wedge segments 27, the wide ends of the wedge segments 27 generally face one another. These wide ends accommodate, by means of respective recesses defined by projecting sections of material, an angled end finger of an annular spring 36. The annular spring 36 pushes the wedge segments 27 apart in the circumferential direction. The spring 36 is kept in its position relative to the wedge segments 27 by a spring fixing washer 37.

Each driver 21a, 21b is secured axially on the outside of the respective first fitting part 11 by way of a clipped-on snap ring 43. A sealing ring 44a, 44b is provided on the outside of the respective second fitting part 12, between the embossing for the gearwheel 16 and the corresponding covering disk 25a, 25b of the driver 21a, 21b. The sealing rings 44a, 44b seal between the second fitting part 12 and the corresponding covering disk 25a, 25b. The inner diameter of the sealing rings 44a, 44b are adapted to the diameter of the corresponding covering disk 25a, 25b. In order to absorb the axially acting forces, brackets 45 are respectively welded onto each of the two fitting parts 11 and 12. For each bracket 45, it is welded to one of the two fitting parts 11 and 12, and it engages over the other of the two fitting parts 11 and 12 without obstructing the adjusting movement. For the sake of clarity, only one of the brackets 45 is illustrated in FIG. 1.

For each fitting 10a, 10b, the wedge segments 27 define an eccentric that presses the gearwheel 16 in the direction of the eccentricity into the gearing 17 at an engagement point. During driving by way of rotating the drive shaft 7, a torque is initially transmitted to the driver 21a, 21b and then to the thus defined eccentric which slides along the sliding bearing bushing 28 displacing the direction of the eccentricity and therefore displacing the engagement point of the gearwheel 16 in the gearing 17, which provides a tumbling rolling movement.

The first fitting 10a is provided with a stopper 51 arranged on the surface of the first fitting part 11 facing away from the second fitting part 12. The stopper 51 comprises a stopper body 53 having shape more or less like (e.g., substantially like) a half ring. Teeth projecting radially to the inside come into engagement with the backside of the gearing 17, thus prepositioning the stopper 51 on the first fitting part 11 during assembling. The stopper 51 and the first fitting part 11 are welded together at the locations of these two toothed engagements and at the upper edge of the stopper 51. A stopper bolt 55 is mounted to the stopper body 53, and the stopper bolt 55 is axially projecting away from the first fitting part 11.

Figures 8, 9:
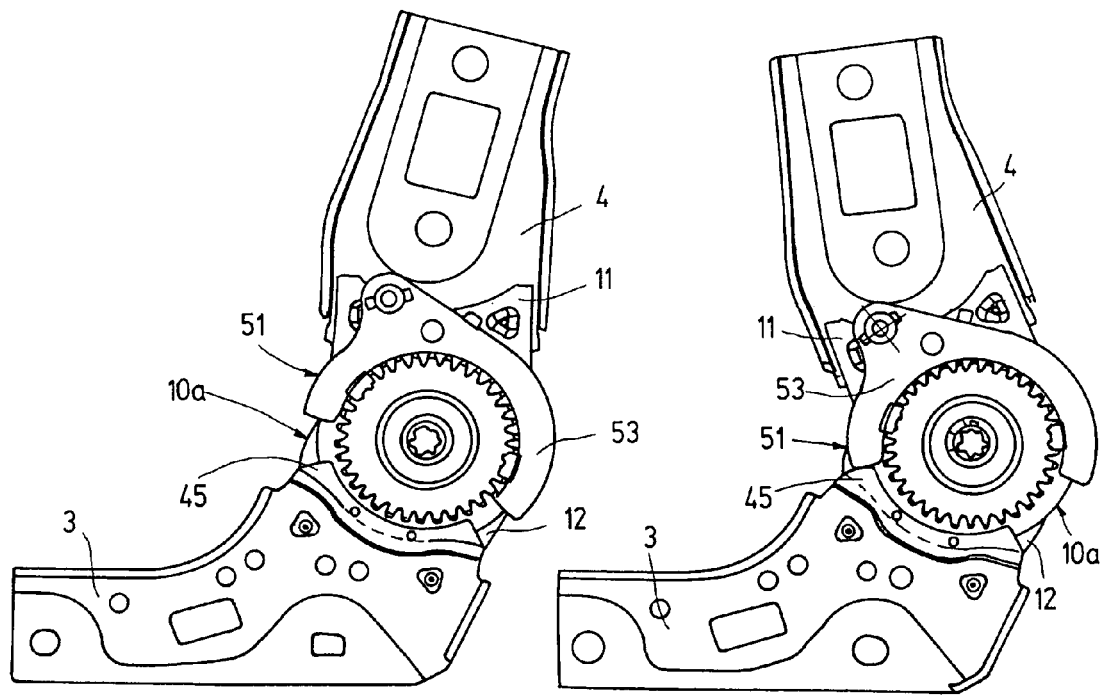
FIG. 8 shows a view of the first fitting when the backrest is in a normal use position.
FIG. 9 shows a view of the first fitting when the backrest is in the front-most use position.
Figure 10:
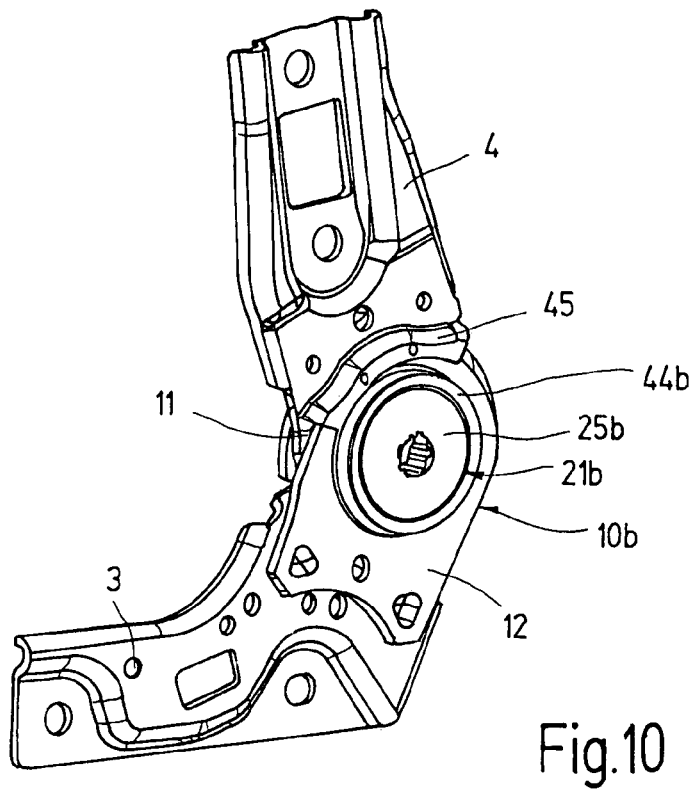
FIG. 10 shows a perspective view of the second fitting.
Figure 11:
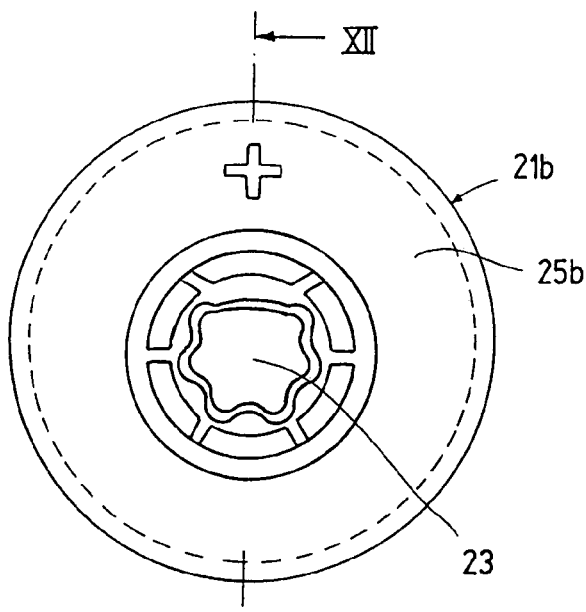
FIG. 11 shows a view of the driver of the second fitting in the direction of the arrow XI in FIG. 12.
Figure 12:
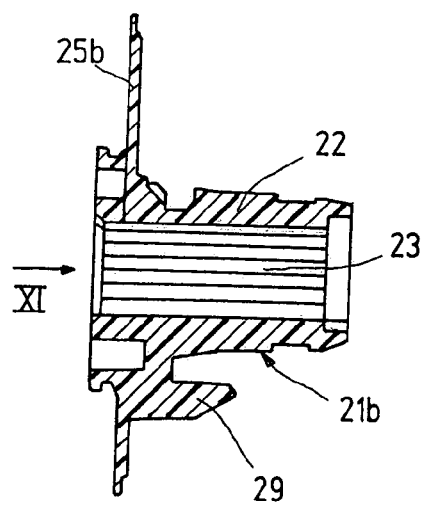
FIG. 12 shows axial section through the driver of the first fitting along the line XII-XII in FIG. 11.

The passenger can use the vehicle seat 1 within a certain range of so called use positions of the backrest 4 corresponding to different inclinations of the backrest 4. The electric motor 5 drives the fittings 10a, 10b to change the angle between the fitting parts 11 and 12 and thus to adjust the inclination the backrest 4, i.e. to change the use position of the backrest 4. When the angle reaches a predefined limit, in FIG. 9 the one corresponding to the front most use position of the backrest 4, the stopper 51 comes into contact with a counter stopper at the seat part 3. More specifically, the stopper 51 comes into contact with the lower bracket 45 (e.g., counter stopper) attached to the second fitting part 12. Due to the counter torque, which is transmitted from the stopper 51 to the fitting part 11, then to the second fitting part 12 and the driver 21a to the drive shaft 7, the electric motor 5 stops. Thus the stopper 51 limits the angle between the fitting parts 11 and 12. As the counter torque only occurs at the first fitting 10a with the stopper 51, the corresponding driver 21a receives a larger load than the driver 21b of the second fitting 10b without stopper 51. Thus, the driver 21a of the first fitting 10a is made of strong metal, and the driver 21b of the second fitting 10b is made of cheaper plastic.

The entire disclosure of US 2005/0179297 A1 is incorporated herein by reference.

It will be understood by those skilled in the art that while the present invention has been discussed above with reference to an exemplary embodiment, various additions, modifications and changes can be made thereto without departing from the spirit and scope of the invention as set forth in the following claims.

The invention claimed is:

1. A fitting system for a vehicle seat, the fitting system comprising:
  a first fitting and a second fitting, wherein for each of the first fitting and the second fitting
    (a) the fitting includes a first fitting part and a second fitting part that are connected to one another by a gear mechanism so that there can be a rolling movement of the second fitting part on the first fitting part,
    (b) an angle is defined between the first fitting part and the second fitting part,
    (c) the angle is changed by the rolling movement, and
    (d) the fitting further includes a driver and an eccentric, wherein the driver is rotatably mounted in the first fitting part for driving the eccentric, and the eccentric is arranged so that rotation of the driver causes the rolling movement of the second fitting part on the first fitting part when the driver is driven;
  a drive shaft for driving both the driver of the first fitting and the driver of the second fitting; and
  a stopper mounted on the first fitting for limiting at least the angle defined between the first fitting part of the first fitting and the second fitting part of the first fitting,
  wherein the driver of the first fitting is made of a material, and the driver of the second fitting is made of a material with a lower mechanical strength than the material that the driver of the first fitting is made of, whereby the material that the driver of the first fitting is made of has a higher mechanical strength than the material that the driver of the second fitting is made of.

2. The fitting system according to claim 1, wherein the driver of the first fitting is made of metal.

3. The fitting system according to claim 2, wherein the driver of the first fitting is produced by metal injection molding process.

4. The fitting system according to claim 1, wherein the driver of the second fitting is made of plastic.

5. The fitting system according to claim 1, wherein the stopper comes into contact with a counter stopper when the angle defined between the first fitting part of the first fitting and the second fitting part of the first fitting reaches a predefined limit.

6. The fitting system according to claim 5, wherein the stopper is mounted on the first fitting part of the first fitting, and the counter stopper is a bracket mounted on the second fitting part of the first fitting.

7. The fitting system according to claim 1, further comprising a motor for driving the drive shaft, whereby the drive shaft is motor-driven.

8. The fitting system according to claim 7, wherein the motor is arranged closer to the first fitting than to the second fitting.

9. The fitting system according to claim 1, wherein each driver comprises a hub with a hole for receiving the drive shaft and a covering disk at one end.

10. The fitting system according to claim 9, wherein:
  the covering disk of the driver of the second fitting has a diameter,
  the covering disk of the driver of the first fitting has a diameter, and
  the diameter of the covering disk of the driver of the second fitting is larger than the diameter of the covering disk of the driver of the first fitting.

11. The fitting system according to claim 1, wherein for each of the first fitting and the second fitting:
  the eccentric of the fitting includes two wedge segments that are pushed apart by a spring, and
  the driver of the fitting includes a driving segment for driving the eccentric.

12. The fitting system according to claim 1, wherein the second fitting does not include a stopper for directly limiting the angle defined between the first fitting part of the second fitting and the second fitting part of the second fitting.

* * * * *